United States Patent [19]
Chiang

[11] Patent Number: 5,513,557
[45] Date of Patent: May 7, 1996

[54] HOT-AIR CIRCULATION UNIT AND A SHAKING BLADE OF A BAKING APPARATUS

[76] Inventor: Ming-Shan Chiang, No. 1008-47 Ying-Chien Village, Hsia-Ying Hsiang, Tainan Hsien, Taiwan

[21] Appl. No.: 512,166

[22] Filed: Aug. 7, 1995

[51] Int. Cl.⁶ ................................................. A47J 27/00
[52] U.S. Cl. ........................ 99/327; 99/348; 366/98; 366/146; 366/314
[58] Field of Search .................. 99/325–327, 331, 99/332, 348, 452, 468, 486; 364/140, 141, 400, 477, 550, 557; 219/492, 494, 501; 366/97, 98, 144–146, 314, 601; 426/231–233, 503, 504, 523

[56] References Cited

U.S. PATENT DOCUMENTS

| | | | |
|---|---|---|---|
| 4,903,587 | 2/1990 | Nagasaka et al. | 99/325 |
| 4,903,588 | 2/1990 | Horiuchi et al. | 99/348 |
| 4,930,899 | 6/1990 | Aoyama | 366/98 |
| 4,984,512 | 1/1991 | Takahashi et al. | 99/327 |
| 5,054,383 | 10/1991 | Cho | 99/327 |
| 5,076,153 | 12/1991 | Takahashi et al. | 99/327 |
| 5,280,150 | 1/1994 | Arai et al. | 99/348 |
| 5,351,606 | 10/1994 | Matsuzaki | 366/314 |
| 5,402,710 | 4/1995 | Chen | 99/331 |
| 5,410,949 | 5/1995 | Yung | 99/468 |
| 5,435,235 | 7/1995 | Yoshida | 364/400 |
| 5,463,937 | 11/1995 | Belongia et al. | 99/348 |

*Primary Examiner*—Timothy F. Simone
*Attorney, Agent, or Firm*—Finnegan, Henderson, Farabow, Garrett & Dunner

[57] ABSTRACT

The baking apparatus includes a surrounding wall that defines a heating chamber, and a kneading case provided centrally in the chamber. The surrounding wall has an upper opening and a lower opening which are formed through the surrounding wall. A guide fin unit is installed on the surrounding wall near the lower opening so as to guide air to enter into the chamber via the lower opening to flow upward along a passage defined between the surrounding wall and the kneading case. The kneading case is provided with a shaking blade that has a vertical rotating shaft adapted to be fastened to the motor shaft of a driving motor, a horizontal plate projecting radially from the rotating shaft, and a trapezoidal sheet fixed on and inclined relative to the plate. The trapezoidal sheet has an inclined side adjacent to but spaced apart from the rotating shaft of the plate in such a manner that, during a kneading operation, the sheet permits sliding movement of dough between the rotating shaft and the inclined side of the trapezoidal sheet.

1 Claim, 5 Drawing Sheets

HOT-AIR CIRCULATION UNIT AND A SHAKING BLADE OF A BAKING APPARATUS

BACKGROUND OF THE INVENTION

1. Field of the Invention

The invention relates to an automatic baking apparatus, more particularly to a hot-air circulation unit and a shaking blade of the baking apparatus.

2. Description of the Related Art

According to U.S. Pat. No. 4,903,587, an automatic baking apparatus includes a surrounding wall that defines a heating chamber therein, a kneading case mounted centrally in the heating chamber, a hot-air circulation unit for supplying hot air into the heating chamber, a shaking blade mounted rotatably within the kneading case and rotatable about a vertical axis, a motor for driving the shaking blade, and a microcomputer having means for controlling operation time of the motor and the hot-air circulation unit to vary duration of kneading, fermentation, baking and cooling steps. The microcomputer is effective to complete baking process with uniform product quality within a constant length of time.

Some of the drawbacks resulting from the use of the aforementioned baking apparatus are as follows:

(I) The hot-air circulation unit includes a lower heater installed below the kneading case at one side of the heating chamber. During circulation of hot air within the heating chamber, the flow speed of hot air decreases upon reaching a corner of the heating chamber located under the kneading case opposite the lower heater. This slowdown retards the succeeding hot air so as to lower the baking ability of dough in the kneading case.

(II) In the aforementioned baking apparatus, the shaking blade is shaped as an elongated vertical plate with uniform width so that the blade has a large kneading face to strike the dough. A high-power motor is thus required to drive the blade in order to knead the dough.

SUMMARY OF THE INVENTION

The main object of the present invention is to provide an automatic baking apparatus which has a highly efficient flow rate of hot air within the heating chamber and which is formed with a blade that can be driven by a small-power motor.

According to the present invention, an upper opening and a lower opening are formed through a surrounding wall which defines a heating chamber. A guide fin unit is installed on the surrounding wall near the lower opening so as to guide air to enter into the heating chamber via the lower opening to flow upward along a passage defined between the surrounding wall and a kneading case which is disposed centrally within the heating chamber and in which dough is kneaded, fermented and baked into bread. The kneading case is provided with a shaking blade having a vertical rotating shaft that is adapted to be fastened to the motor shaft of a driving motor, a horizontal plate that projects radially from the rotating shaft, and a trapezoidal sheet that is fixed on and that is inclined relative to the plate. The trapezoidal sheet has an inclined side adjacent to but spaced apart from the rotating shaft in such a manner that, during a kneading operation, the sheet permits sliding movement of dough between the rotating shaft and the inclined side of the trapezoidal sheet.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Figure 1:
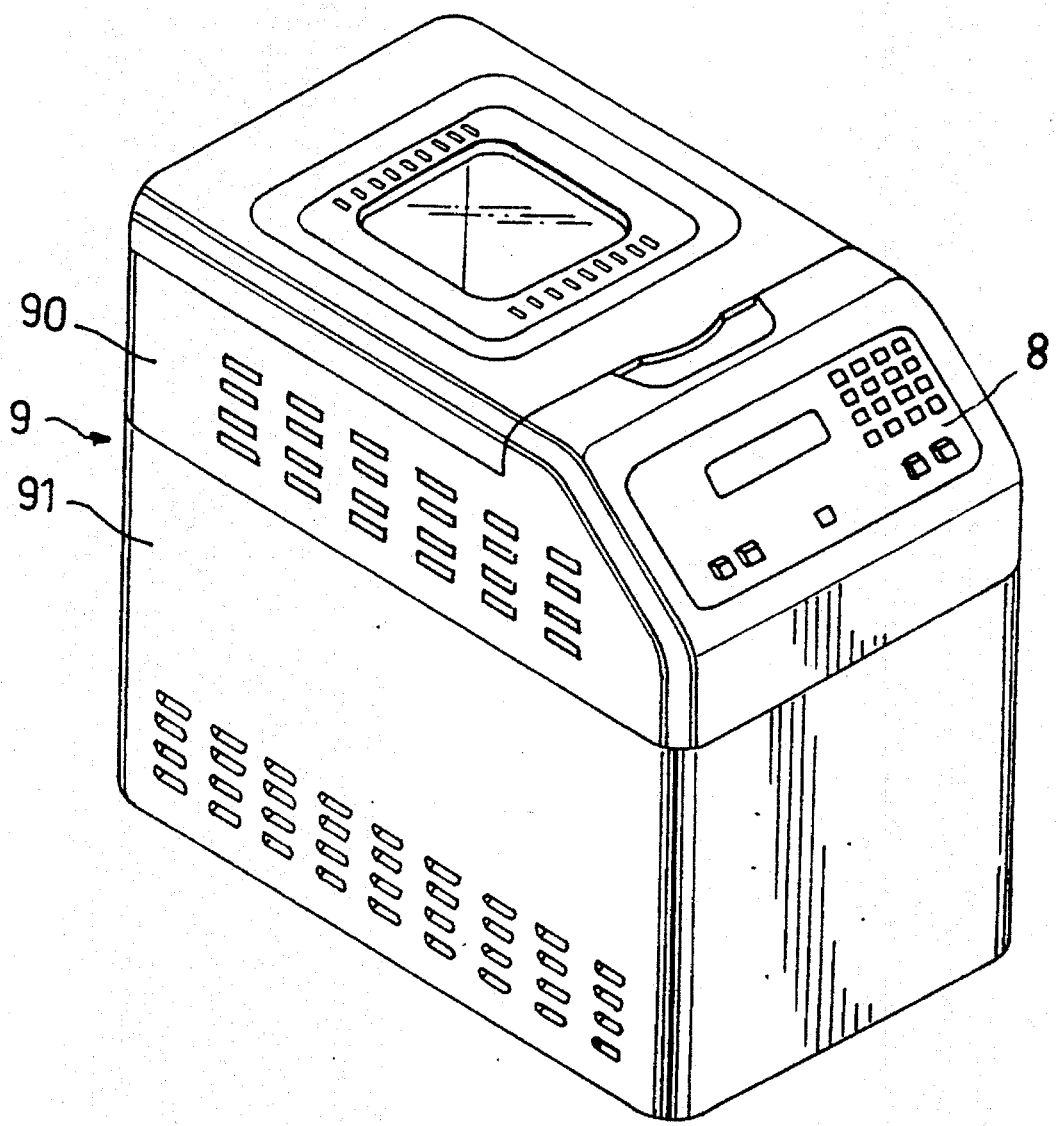
FIG. 1 is a schematic view of an automatic baking apparatus of the present invention.
Figure 2:
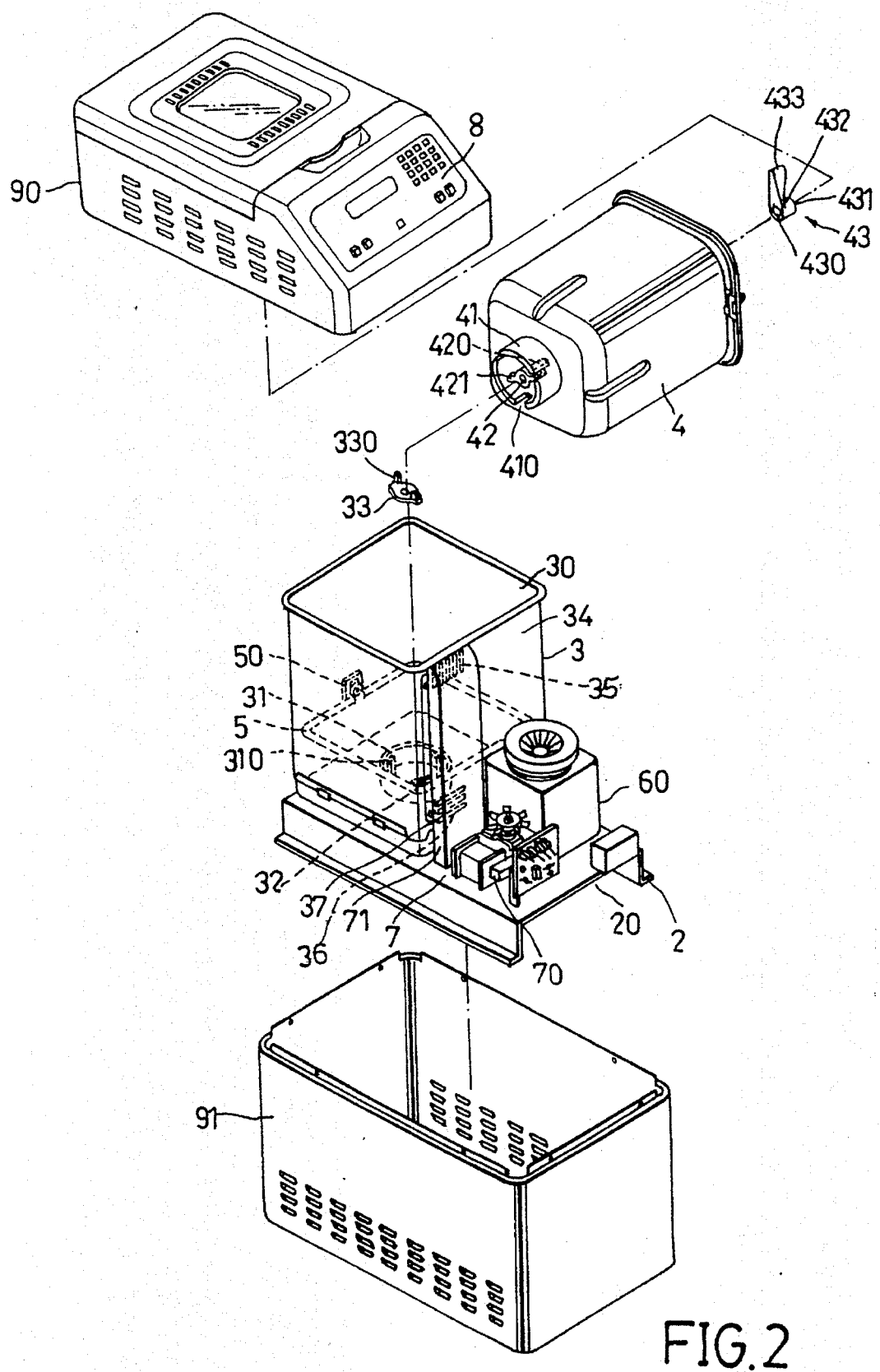
FIG. 2 is an exploded view of the automatic baking apparatus of the present invention.

Referring to FIGS. 1 and 2, an automatic baking apparatus of the present invention includes a casing 9 constituted by a lower half 91 and an upper half 90, a surrounding wall 34 that defines a heating chamber 3 therein, a kneading case 4 mounted centrally in the heating chamber 3, a hot-air circulation unit for supplying hot air into the heating chamber 3, a shaking blade 43 mounted to a rotatable shaft 42 of the kneading case 4, a motor 60 for driving the shaking blade 43, and a microcomputer 8 having means for controlling operation time of the motor 60 and the hot-air circulation unit to vary duration of kneading, fermentation, baking and cooling steps. The microcomputer 8 is effective to complete baking process with uniform product quality within a constant length of time similar to that of the prior art.

The surrounding wall 34 is fixed on an upper surface of an inverted U-shaped base 2 which, in turn, is secured to a bottom of the lower half 91 and which defines a space 20 therein. The surrounding wall 34 has a circular opening unit formed through the lower end portion thereof and defined by an inner wall 31, three spaced axially extending engaging keys 310 formed on the inner wall 31, and a rotatable shaft 32 extending axially into the heating chamber 3. An actuator 33 is provided with two engaging tabs 330 and is fastened to the upper end of the rotatable shaft 32. The kneading case 4 has a tubular insert 41 integrally formed with a bottom portion thereof, the rotatable shaft 42 mounted rotatably on the bottom portion thereof in such a manner that a top end 420 of the shaft 42 extends into the kneading case 4 while a lower end of the shaft 42 extends into the insert 41. The tubular insert 41 is inserted into the opening unit of the surrounding wall 34 so that the keys 310 engage the engaging notches 410 of the kneading case 4, while the engaging tabs 330 of the actuator 33 abut against the flat surfaces 421 of the central shaft 42. A heating element 5 is provided in the chamber 30. An opposed pair of positioning units 50 abut against the kneading case 4 so as to prevent shaking of the latter during a kneading operation.

The surrounding wall 34 further has an upper opening 35 and a lower opening 36 which are formed through the surrounding wall 34, and a fin unit 37 installed on the surrounding wall 34 near the lower opening 36 so as to guide air to enter into the chamber 3 via the lower opening 36 to flow upward along a passage defined between the surrounding wall 34 and the kneading case 4. The upper opening 35 is constituted by a plurality of vertical slots, while the lower opening 36 is constituted by a plurality of horizontal slots. The guide fin unit 37 includes a plurality of L-shaped plates.

The hot-air circulation unit 7 includes an elongated tubular fan casing 71 (see FIG. 2) mounted on an external surface of the surrounding wall 34 of the chamber 3 in communication with the upper and lower openings 35, 36 thereof, an air inlet 701 formed under the base 2 and in communication with the fan casing 71, an electrically operated fan unit 70 disposed at a position lower than the lower opening 36 and in communication with the fan casing 71.

Figure 3:
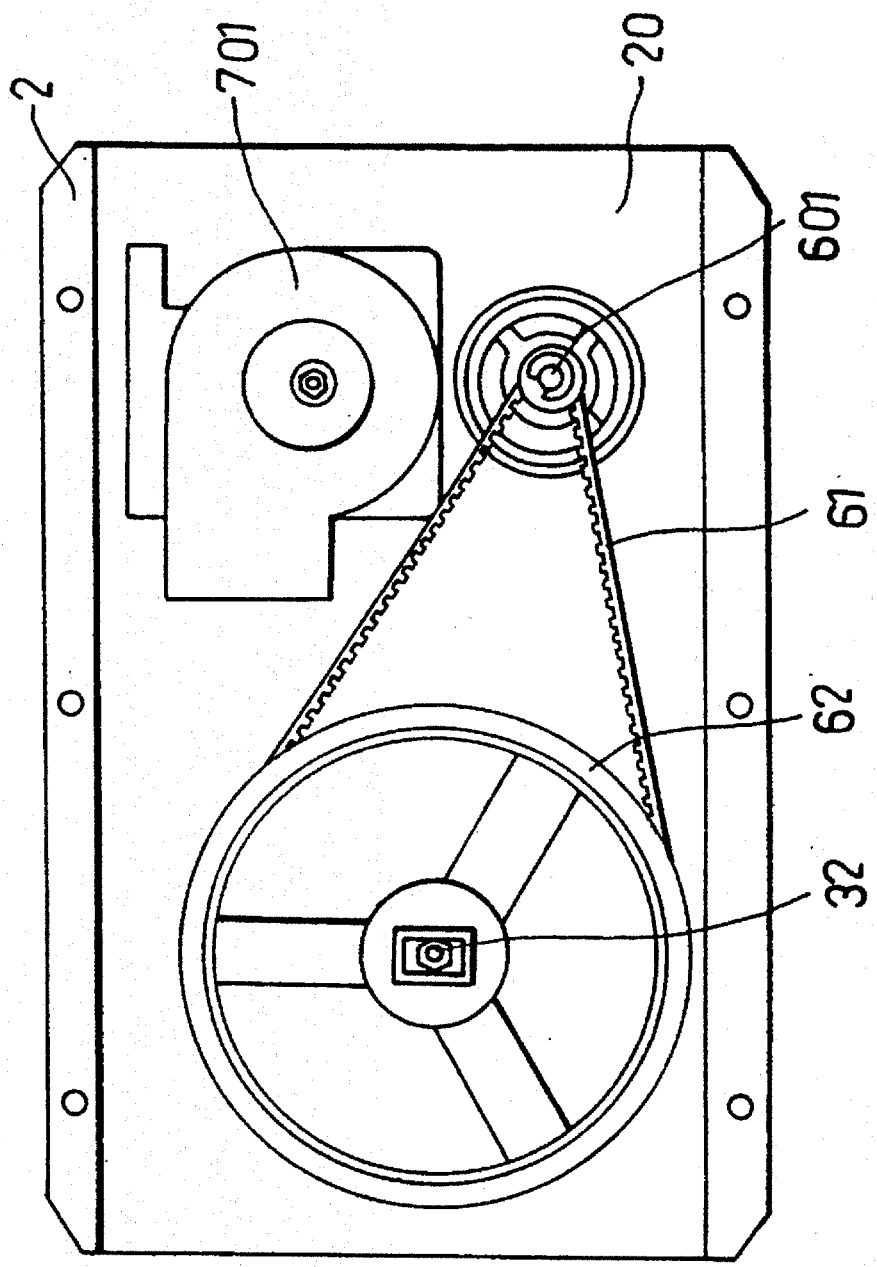
FIG. 3 illustrates a bottom view of a mounting base of the baking apparatus of the present invention.
Figure 4:
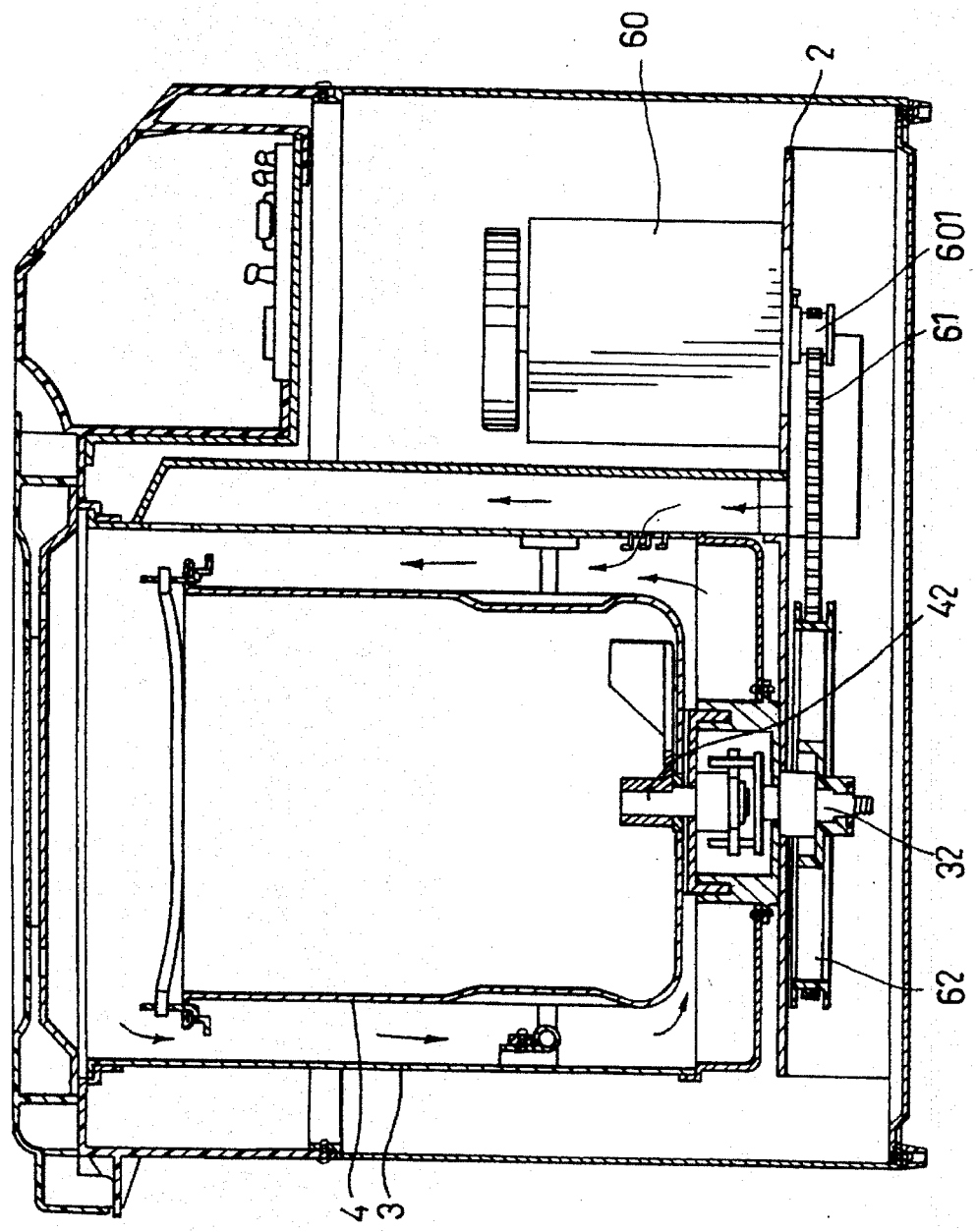
FIG. 4 shows how hot air flows during the kneading operation of dough in a kneading case so as to ferment the dough in accordance with the present invention.

Referring to FIGS. 3 and 4, a driven wheel 62 is disposed below the base 2 and has an axle extending into the lower end portion of the heating chamber 3 to connect with the rotatable shaft 32. The motor 60 is mounted on the upper surface of the base 2 outside of the heating chamber 3 and has a driving axle 601 which extends into the space 20 of the base 2 to connect the driven wheel 62 by means of an endless chain 61. Thus, when the motor 60 is actuated, rotation of the motor 60 is transmitted to the rotatable shaft 42 of the kneading case 4 via the driven wheel 62.

Figure 5:
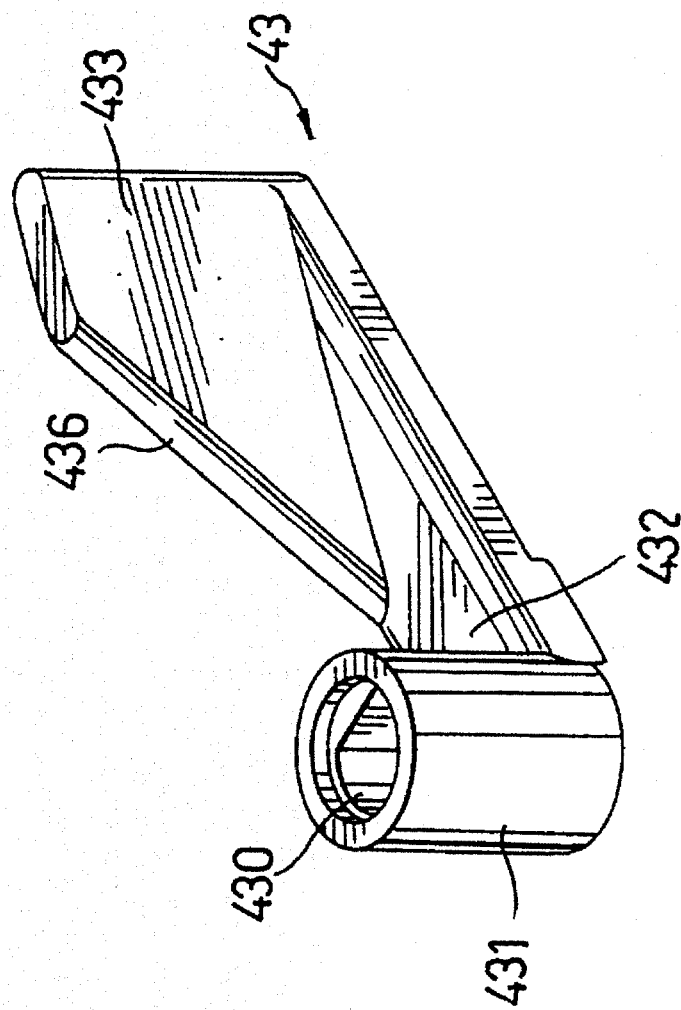
FIG. 5 is a perspective view of a shaking blade of the baking apparatus of the present invention.

Referring to FIG. 5, the shaking blade 43 has a vertical rotating shaft 431 which is shaped in the form of a tube that defines a pivot hole 430 and which is sleeved securely on the top end 420 (see FIG. 2) of the rotatable shaft 42, a horizontal plate 432 projecting radially from the rotating shaft 431, and a trapezoidal sheet 433 that is fixed on and that is inclined relative to the plate 432. The sheet 433 has an inclined side 436 adjacent to but spaced apart from the rotating shaft 431 in such a manner that, during a kneading operation, dough can slide between the rotating shaft 431 and the inclined side 436 of the trapezoidal sheet 433.

From the above explanation, it can be appreciated that the baking apparatus of this invention has better hot air circulation so as to provide more effective kneading, fermentation and baking operations. Due to the unique structure of the shaking blade 43, it is not necessary for the motor 60 to generate so much torque, thus prolonging the life service of the motor 60.

With the present invention thus explained, it is obvious to those skilled in the art that various modifications and variations can be made without departing from the scope and spirit thereof. It is therefore intended that the invention be limited only as in the appended claims.

I claim:

1. A baking apparatus including a surrounding wall that defines a heating chamber therein, a kneading case mounted centrally in the heating chamber, a hot-air circulation unit for supplying hot air into the heating chamber, a shaking blade mounted rotatably within the kneading case and rotatable about a vertical axis, a motor for driving rotatably the shaking blade, and a microcomputer including means for controlling operation time of the motor and the hot-air circulation unit to vary duration of kneading, fermentation, baking and cooling steps, the microcomputer being effective to complete baking process with uniform product quality within a constant length of time, wherein the improvements comprises:

the surrounding wall further having an upper opening and a lower opening which are formed therethrough, and a guide fin unit installed on said surrounding wall near the lower opening so as to guide air to enter into said chamber via said lower opening to flow upward along a passage defined between said surrounding wall and said kneading case; and said shaking blade having a vertical rotating shaft adapted to be fastened to a motor shaft of said motor, a horizontal plate secured to and extending radially from said rotating shaft, and a trapezoidal sheet fixed on and inclined relative to said plate, said trapezoidal sheet having an inclined side adjacent to but spaced apart from said rotating shaft in such a manner that, during a kneading operation, said sheet permits sliding movement of dough between said rotating shaft and said inclined side.

* * * * *